Patented Sept. 5, 1944

2,357,414

UNITED STATES PATENT OFFICE 2,357,414

MOLE TRAP

Ray McJunkin, Chicago, Ill.

Application March 18, 1943, Serial No. 479,651

1 Claim. (Cl. 43—86)

The present invention relates to new and useful improvements in traps, particularly for moles, and has for its primary object to provide a device of this character comprising a novel trigger mechanism.

Another very important object of the invention is to provide a trap of the character described which is adapted to catch and hold the mole without damaging the skin of the animal in any way.

Other objects of the invention are to provide a mole trap of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a perspective view of one of the triggers.

Figure 5 is a fragmentary view in vertical section, taken substantially on the line 5—5 of Figure 2.

Figure 1:
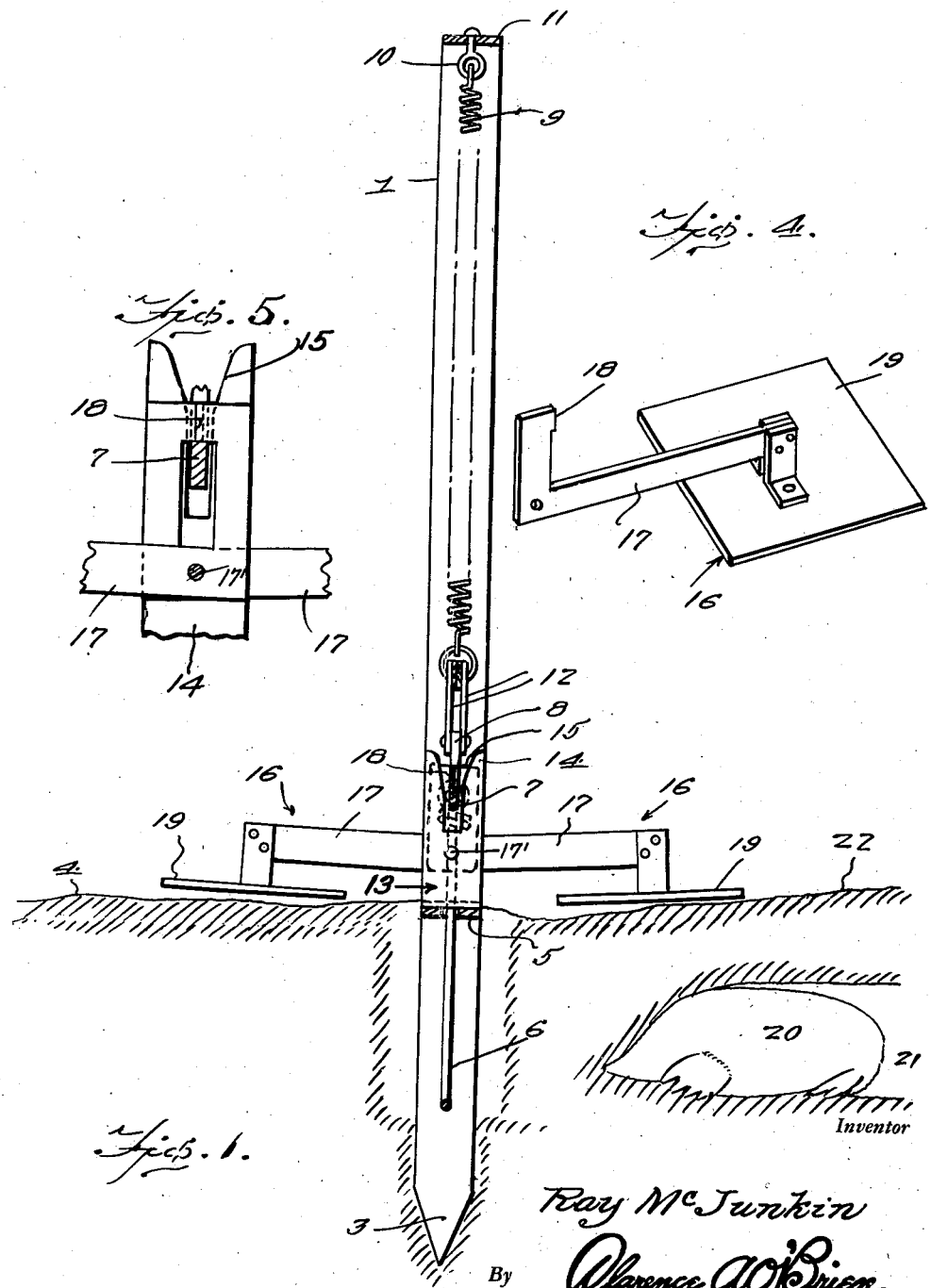
Figure 1 is a vertical sectional view through a mole trap constructed in accordance with the present invention, showing the device set for operation.
Figure 2:
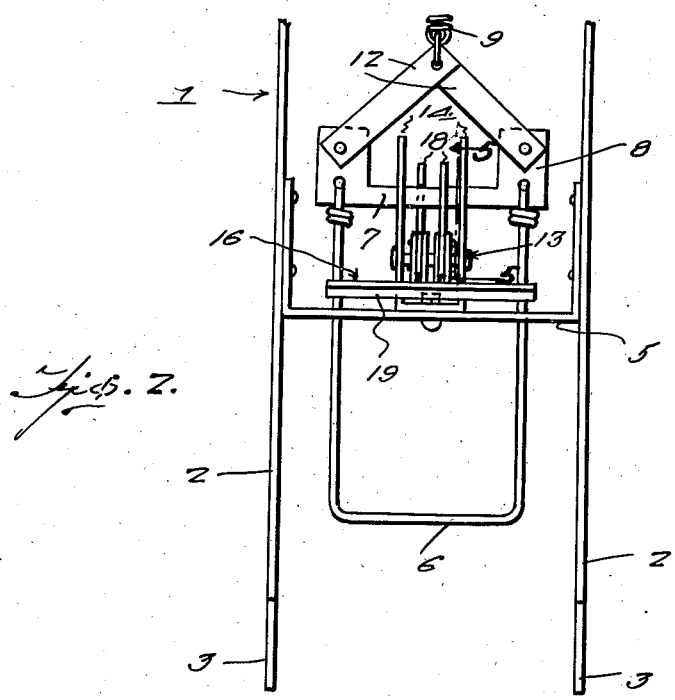
Figure 2 is an elevational view of the lower portion of the trap, taken at right angles to Figure 1.
Figure 3:
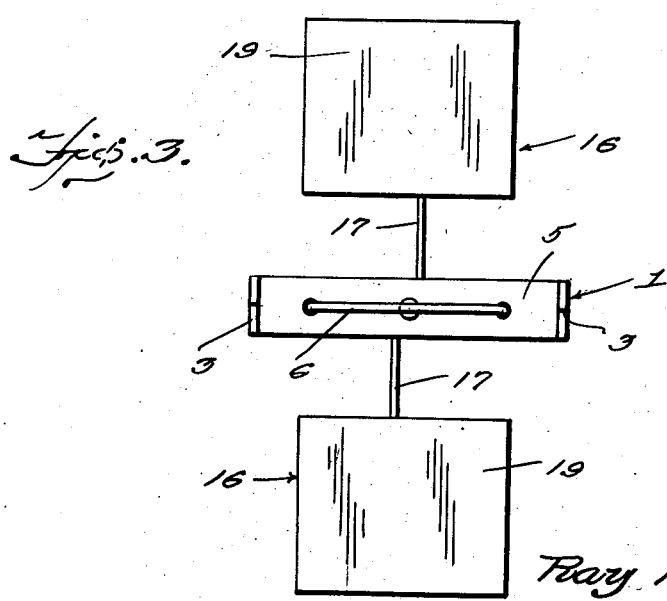
Figure 3 is a bottom plan view of the device.

Referring now to the drawings in detail, it will be seen that the embodiment of the invention which has been illustrated comprises a substantially U-shaped metallic frame which is designated generally by reference numeral 1. The legs 2 of the frame 1 terminate in points 3 at their lower ends to facilitate penetrating the ground 4.

A metallic bar 5 extends between the lower portions of the frame legs 2. The bar 5 is perforated to accommodate a substantially U-shaped, vertically slidable loop 6 of suitable heavy wire. The ends of the loop 6 are secured to a horizontal metallic bar 7 above the bar 5. The bar 7 includes enlarged, upstanding end portions 8.

A coil spring 9 has its upper end connected, as at 10, to the bight portion 11 of the frame 1. At its lower end, the coil spring 9 is connected by links 12 to the end portions 8 of the bar 7.

A substantially U-shaped, upstanding bracket 13 is mounted on the bar 5. The end portions 14 of the U-shaped bracket 13 have formed therein vertical slots 15 for the reception of the bar 7.

Triggers 16 releasably secure the bar 7 in the slots 15 against the tension of the coil spring 9. The triggers 16 include oppositely projecting arms 17 which are pivotally secured, at one end, as at 17' for swinging movement in a vertical plane in the lower portion of the bracket 13. The arms 17 include, on their pivoted ends, upstanding hooks 18 which are engageable over the bar 7 on the opposite sides thereof from which said arms 17 extend. Plates 19 are mounted on the free ends of the arms 17.

It is thought that the operation of the trap will be readily apparent from a consideration of the foregoing. Briefly, to set the trap, the triggers 16 are swung upwardly for swinging the hooks 18 outwardly. The bar 7 is then moved downwardly into the slots 15 against the tension of the spring 9 thereby lowering the loop 6 to set position. The triggers 16 are then lowered to a substantially horizontal position for engaging the hooks 18 over the bar 7. The lower portion of the trap is then embedded in the ground 4 in such a position that a mole, as at 20, traveling in a run 21, will pass through the loop 6 and beneath the triggers 16. When the mole raises the ground, as at 22, the trap is sprung in the following manner. As the mole 20 approaches one side of the trap, the trigger 16 on that side will be released, the bar 7 being still held down by the trigger on the far side of the trap. As the mole 20 is passing through the loop 6 and while it is substantially half-way through, the trigger 16 on the far side of the trap will be released and the trap thereby sprung so that the mole is held tightly in the loop 6 against the bar 5.

It is believed that the many advantages of a mole trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A mole trap comprising a substantially U-shaped frame adapted to be erected in the ground, a horizontal bar mounted in the frame and having a bracket secured thereto, a spring suspended in the frame, a bar mounted on the lower end of the spring, a substantially U-shaped loop suspended from the second-named bar and slidable vertically through the first-named bar, said loop being cooperable with said first-named bar for retaining a mole, and a pair of ground-engaging triggers pivotally mounted on the bracket and engageable with the second-named bar for releasably securing said second-named bar and the loop in lowered position against the tension of the spring, said triggers extending from opposite sides of the frame for successive release by raising of the ground as the mole burrows, whereby a trigger is provided on the far side of the trap in either direction of approach by the mole and for releasing the second-named bar while the mole is passing through the loop.

RAY McJUNKIN.